United States Patent [19]

Baker

[11] Patent Number: 5,040,368
[45] Date of Patent: Aug. 20, 1991

[54] ELECTROTHERMALLY OPERATED ACTUATOR AND SEAL

[75] Inventor: William E. Baker, Houston, Tex.

[73] Assignee: Actronics Incorporated, Waltham, Mass.

[21] Appl. No.: 583,473

[22] Filed: Sep. 17, 1990

Related U.S. Application Data

[63] Continuation-in-part of Ser. No. 412,181, Sep. 25, 1989, Pat. No. 4,979,365.

[51] Int. Cl.⁵ ............................................. F01K 21/00
[52] U.S. Cl. ..................................... 60/657; 60/531; 60/670; 277/3; 277/59; 277/102
[58] Field of Search .................... 277/3, 27, 59, 102; 60/527, 530, 531, 646, 657, 670

[56] References Cited

U.S. PATENT DOCUMENTS

| | | | |
|---|---|---|---|
| 3,474,734 | 10/1969 | Stogner | 277/59 X |
| 3,884,041 | 5/1975 | Zerlauth | 60/657 |
| 4,005,580 | 2/1977 | Swearingen | 60/657 |
| 4,235,413 | 11/1980 | Baker | 60/531 X |
| 4,352,499 | 10/1982 | Foster | 277/102 X |
| 4,515,512 | 5/1985 | Hertell et al. | 277/59 X |
| 4,613,140 | 9/1986 | Knox | 277/59 X |

Primary Examiner—Allen M. Ostrager
Attorney, Agent, or Firm—Bill B. Berryhill

[57] ABSTRACT

An improved actuator of the type in which a piston is translatable in a piston housing in response to an expandable working fluid in fluid communication with one end of the piston. An improved sealing assembly prevents leakage of working fluid from the piston housing.

29 Claims, 2 Drawing Sheets

ELECTROTHERMALLY OPERATED ACTUATOR AND SEAL

CROSS REFERENCE TO RELATED APPLICATION

This is a continuation-in-part of Application Ser. No. 412,187, filed Sept. 25, 1989, now U.S. Pat. No. 4,979,365.

BACKGROUND OF THE INVENTION

1. Field of the Invention

The present invention pertains to electrothermally operated actuators of the type in which a piston is translatable in a piston housing in response to electrical heating of an expandable working fluid. In particular, the present invention pertains to an improved electrothermally operated actuator and improved sealing systems suitable for use therewith.

2. Description of the Prior Art

There are many types of actuators for actuating operable devices: manual, hydraulic, pneumatic, electrical, or combinations thereof. Because of efficiency, compactness, remote controlling and other characteristics, electrically operated actuators are preferred in many situations. Current electric actuators, particularly of the linear type, utilize either solenoids or motor-gear trains rotating a ball screw to obtain linear motion of a threaded shaft.

Solenoid type actuators are typically used in applications such as water valves on dish washers and washing machines and numerous other applications in industry, office machinery, homes, vending machines, etc. However, solenoids are limited to operation of relatively small devices since the piston force produced is about one pound of force per cubic inch of solenoid volume.

A more expensive alternative to solenoid actuators are those which utilize a motor-gear train driving a ball screw. This type of actuator has a number of moving parts and is correspondingly less reliable than the solenoid. It is capable of producing larger forces for relatively large loads and is used where cost, weight and bulk are not problems. Obviously, the linear movement produced by an actuator of the motor-gear train type is much slower than that of a solenoid actuator.

In summary, the solenoid actuator has only one moving part, but low available force per unit volume. The motor-gear train actuator produces greater forces but is slower, more complex, relatively expensive, etc. Obviously, there is much room for improvement in electrically powered actuators, particularly in the area of moderate forces and speedy operation.

In the past, attempts have been made to pressurize a piston-cylinder actuator by electrically heating an expandable fluid in communication therewith. Examples may be seen in U.S. Pat. Nos. 2,322,762; 3,431,726; 4,079,589; and 4,711,270. Most such efforts have been only moderately successful and have produced actuators too slow to compete with the solenoid actuator which has an operating time of a fraction of a second.

The present applicant, in a previous U.S. Pat. No. 4,235,413, closed an electrothermally operated actuator in which an expandable fluid, such as water, is heated in a tube and expanded into steam, the steam translating a piston within a cylinder or housing for transmitting force to an operable device, e.g. a valve. By controlling the supply voltage, the fluid heats up and actuates a valve from open to close in about twenty seconds. Equilibrium temperature is reached and the valve remains closed as long as the current is on. When the supply voltage is switched off, the fluid cools and condenses and the valve opens, under a spring load, in about twenty seconds. While this valve actuator is a substantial improvement over the prior art, its speed and power consumption could be improved.

SUMMARY OF THE PRESENT INVENTION

The present invention is an electrothermally operated actuator of the type in which a piston is translatable in a piston housing in response to electrical heating of an expandable working fluid in fluid communication with the housing and one end of the piston. The working fluid, e.g. water, is at least partially disposed in a coiled tube through which an electric current may be passed for heating of the tube and the working fluid therein. The tube is part of an electric circuit which includes an electric power source. The electric circuit also includes a first switch which is operable to close the electric circuit for selectively passing a current through the tube and the working fluid to effect movement of the piston from a retracted terminal position within the piston housing to an extended terminal position in which a portion of the piston extends out of the piston housing. The electric circuit also includes a second switch which is responsive to movement of the piston from its retracted terminal position to its extended terminal position to open the circuit allowing the working fluid to cool. A biasing mechanism is connected to the piston for returning the piston and maintaining it in its retracted terminal position when the electric circuit is opened. The electric circuit may also include a third switch which is responsive to movement of the piston from the retracted terminal position to its extended terminal position to open the circuit and prevent subsequent closing thereof until the piston has completely returned to its retracted terminal position. Other protective features are disclosed.

In a preferred embodiment of the invention, the electrothermally operated actuator of the present invention is connected through a power translating assembly to a rotating element of an operable device such as a valve, the power translating assembly translating linear movement of the piston to rotating movement of the rotating element. The translating assembly may include a clutch member which is engageable with the rotating element of the operable device to effect rotation thereof upon movement of the piston from its retracted terminal position to its extended terminal position. In a preferred embodiment, the clutch member is disengageable during return of the piston member to its retracted terminal position so that the rotating element rotates only during movement of the piston toward its extended terminal position.

The electrothermally operated actuator of the present invention is provided with an improved sealing assembly to prevent leakage of working fluid from the piston housing. The sealing assembly may include an axially spaced first and second seal surrounding the piston and sealingly engaging the piston housing. One side of the first seal is exposed to working fluid within the housing and one side of the second seal is exposed to the environment into which the piston projects from the housing. A sealing fluid is disposed in an annular space surrounding the piston between the first and second seals, the sealing fluid having a substantially lower vapor pressure than that of the working fluid. In a preferred embodiment, the seal assembly includes a tubular spacer disposed in the annular space between the first and second seals keeping the first and second seals axially spaced from each other.

The improved electrothermally operated actuator of the present invention provides an actuator which produces a power stroke comparable in speed to those of solenoids with a stroke time of under one second. However, it generates a force from ten to twenty times that of a solenoid of comparable size and weight. It has only one moving part, the piston, compared to numerous moving parts of a conventional motor-gear train actuator. The working fluid of the actuator of the present invention is uniquely contained by a combination piston-housing seal and low pressure seal buffer fluid which also acts as a lubricant. The resulting actuator is power efficient, compact and relatively maintenance free. Other objects and advantages of the invention will be apparent from reading the description which follows in conjunction with the accompanying drawings.

DESCRIPTION OF A PREFERRED EMBODIMENT

Figure 1:
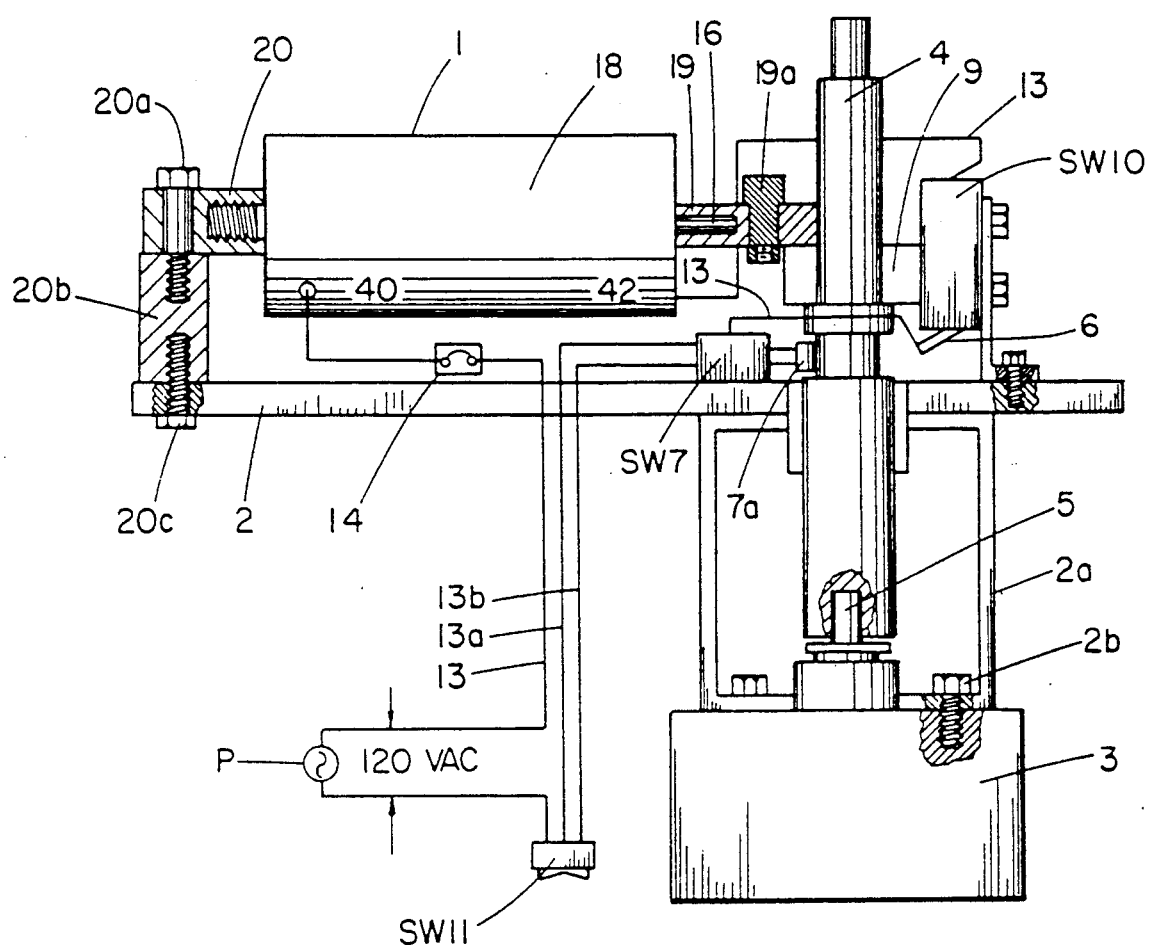
FIG. 1 is an elevation view of an electrothermally operated actuator connected to an operable device, such as a valve, according to a preferred embodiment of the invention.
Figure 2:
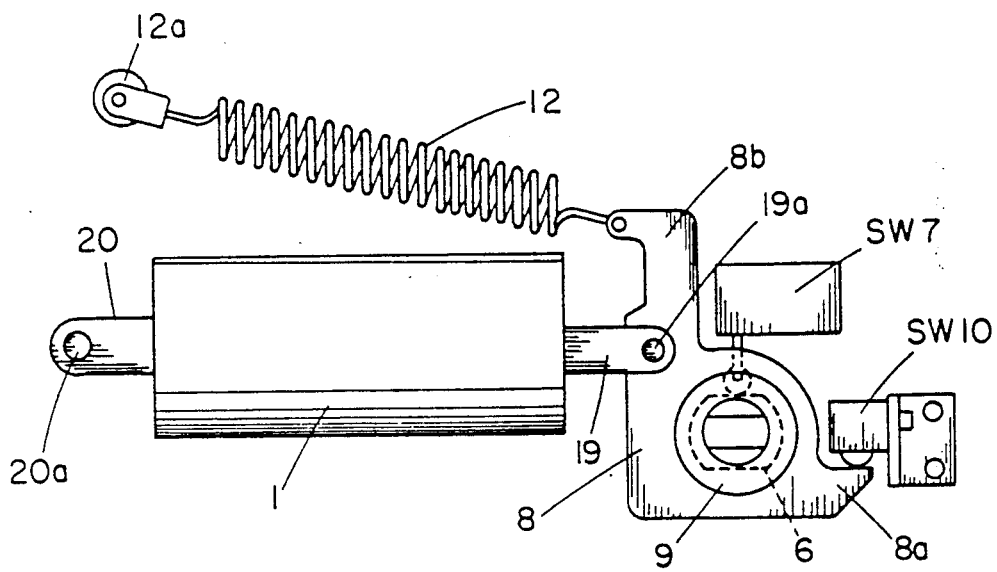
FIG. 2 is a plan view of the actuator and operable device of FIG. 1.

Referring first to FIGS. 1 and 2, an electrothermally operated actuator 1 is mounted on a base plate 2 which is attached by suitable mounting brackets 2a and screws 2b to an operable device such as a ball valve 3. The ball valve 3 has an operating stem 5 for operation of the closure member (not shown) thereof. Stem 5 is extended by extension shaft 4. The extension shaft 4 is machined so as to provide a cam 6 having four lobes or operating points essentially at ninety degree intervals about its periphery. A crank arm 8 is connected through a one way clutch bearing 9 to the stem extension 4. The crank arm 8 is, in turn, connected to a piston 16 (more fully described hereafter) of the actuator 1 by a clevis 19 of nonconducting material such as nylon and a cooperating pin 19a. The opposite end of the actuator 1 is anchored to the base 2 through a nylon clevis 20, a cylindrical mounting member 20b and cooperating bolts or screws 20a and 20c. Both of the nylon clevises or linkages 19 and 20 serve to insulate the actuator 1 from other components.

It will be noted that the crank 8 is connected to one end of a helically wound biasing spring 12 the opposite end of which is attached to a mounting member 12a on the base plate 2. The spring 12 biases the crank member and consequently the piston 16 toward a retracted terminal position as shown in FIGS. 1 and 2.

There is an electric circuit associated with the components of the present invention. The circuit includes a power source P and a common lead or wire 13 connected at terminals 40 and 42 of the actuator 1. The details of the actuator 1 will be described hereafter. Also connected in the circuit are first and second switches 11 and 7 which are connected by a three-way switching circuit. Both the switches 11 and 7 are preferably single pole, double throw (SPDT) switches connected by three electrical conductors. The common lead 13 connects common terminals. A second wire 13a connects the normally open (NO) terminals and a third wire 13b connects the normally closed (NC) terminals. Also connected in series with switch 7 and 11 through the common lead 13 is a third switch 10 which is a single pole, single throw (SPST) switch. The circuit may also include a resettable circuit breaker 14. The switch 11 is a remotely operable switch. Switch 7 has a cam follower 7a and operates in response to rotation of the cam 6 on the valve stem extension 4. Switch 10 is a limit switch which operates, sequentially with switch 7, in response to contact with the crank 8, being closed when engaged by extension 8a thereon, and opened, in response to ninety degree rotation of the stem extension 4, by engagement with extension 8b of the crank 8.

Figure 3:
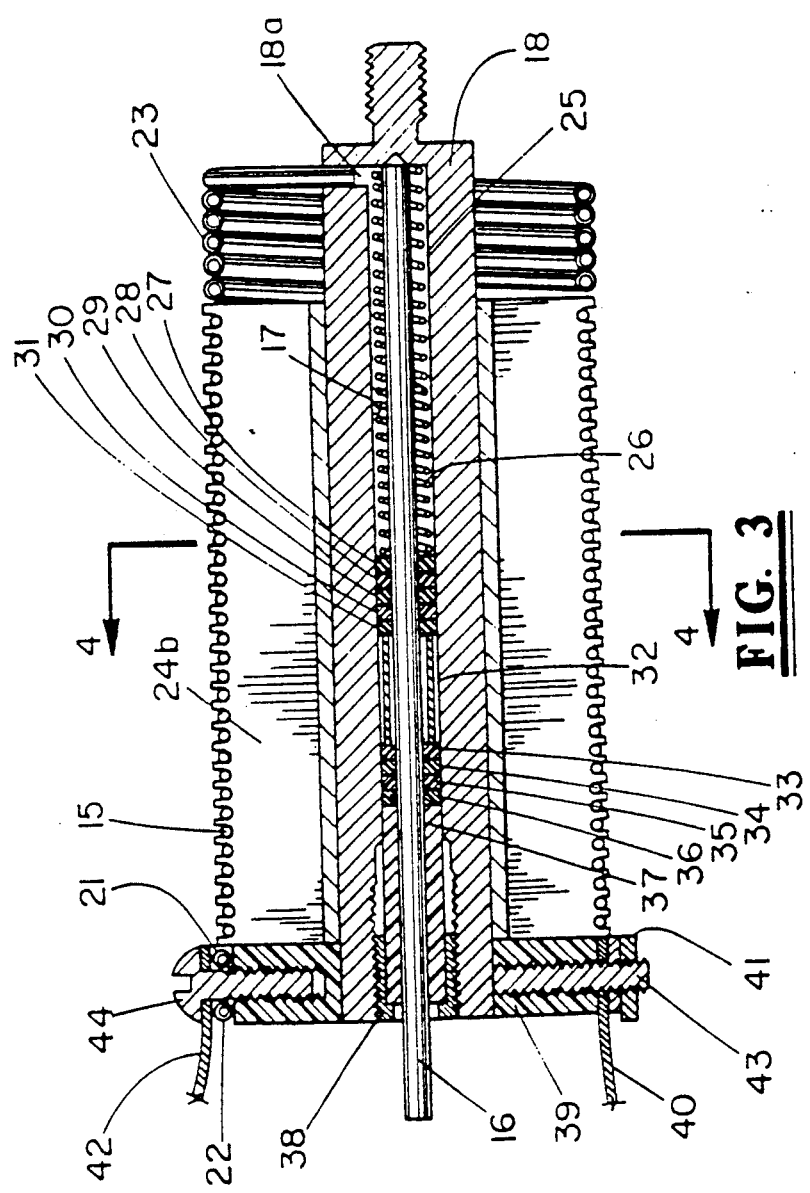
FIG. 3 is a longitudinal view, partially in section, of the electrothermally operated actuator of FIGS. 1 and 2, according to a preferred embodiment of the invention.
Figure 4:
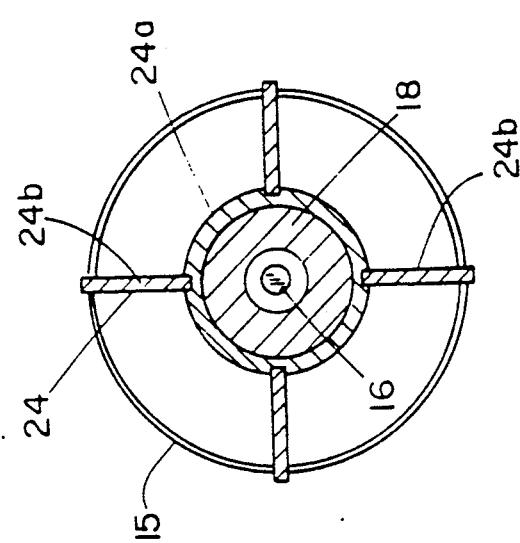
FIG. 4 is a cross-sectional view, taken along lines 4—4 of FIG. 3, of the electrothermally operated actuator of the present invention.

Attention is now specifically directed to FIGS. 3 and 4 for a better understanding of the actuator 1. Actuator 1 includes a hollow cylinder or piston housing 18, closed at one end, and in which is disposed an axially translatable piston 16. Piston 16 is positioned in a cylindrical bore 17 of the housing 18 by non-metallic bearing 37. This bearing 37 and the seal stacks, described hereafter, allow dust particles entrained on the piston to be imbedded in the non-metallic materials thereof to serve as polishing matrices. The piston projects out of one end of the housing 18 and is free to move between a retracted terminal position, as illustrated in FIG. 3, and an extended terminal position in which a portion of the piston 16 extends out of the piston housing 18.

To the right of the bearing 37 (as viewed in FIG. 3) is a unique dual seal system which includes a compression spring 26 a tubular spacer 32 and a pair of axially spaced seal stacks or assemblies. The first seal assembly includes a washer 27 of a plastic material such as polyamide-imide (Torlon) which rests against the spring 26, a Teflon washer 28, an elastomeric ring 29 of a suitable synthetic rubber such as a Buna N or a Viton compound, a Teflon washer 30 and another plastic washer 31 of a material such as Torlon which has sufficient compressive strength to support the force applied thereto by the tubular spacer 32. The tubular spacer 32, made of a suitable material such as brass, bears against washer 31 and also against washer 33 of the second seal assembly. The washer 33 is also of a material such as Torlon, which will withstand the compression force applied by one end of the spacer 32. The second seal assembly also includes a Teflon washer 34, an elastomeric ring 35 and a Teflon washer 36 which bears against the bearing 37. The entire seal and bearing assembly is retained by a threaded member 38 which has an oversize opening for the piston 16 to pass through.

The axial load produced by the spring 26 and transmitted through spacer 32 forces the elastomeric seals 29 and 35 to deform radially (inwardly against the piston 16 and outwardly against the bore 17 of the hollow cylinder 18) effecting seals on both the bore and the piston. The Teflon rings on either side of the elastomeric seals 29 and 35 insure a zero clearance between them and the bore and the piston to completely contain the elastomeric seals 29 and 35, preventing these seals from deforming at high pressure. The Torlon rings or washers support the ends of spring 26 and spacer 32 and protect the Teflon rings from creep due to spring load and pressure load on the first seal assembly and composite loads transmitted through the spacer 32 to the second seal assembly. Disposed in the annular space surrounding the piston between the first and second seal assemblies is a sealing fluid selected for characteristics of lubrication and low vapor pressure. It is sufficient to state that the sealing fluid may be of a low-vapor-pressure silicone, such as methyl alkyl silicone, when the working fluid adjacent the first seal assembly is water or steam.

Surrounding the piston housing 18, in a helical coil, is a tube assembly which includes a small metallic tube 15, e.g. stainless steel, which terminates in a terminal tube 21 and a seal closed at 22. The opposite end of the tube 15 is connected to a cooling tube 23, e.g. stainless steel. The opposite end of the cooling tube 23 is in fluid communication through a port 18a with the bore 17 of the cylinder 18 and consequently with the lower portion of the piston 16. It will be noted that the tube 15 is positioned by an insulating coil form 24, having a central core 24a which is installed around the cylinder 18 and includes radial spokes 24b having notches to retain the tube 15. This protects the tube 15 from shock or mechanical damage and prevents adjacent turns thereof from touching one another. The tube 15 is filled with a vaporizable fluid such as water.

One end of the tube assembly 15, 21, 23 is connected by threaded screw 44, a spade connection or other suitable means to electrical terminal 42. The other electrical terminal 40 is connected through a threaded metallic member 43 to the piston housing 18. Thus the electrical circuit previously described may be completed through the tube assembly 15, 21, 23 and the piston housing 18. Flow of electrical energy through the length of the tube assembly 15, 21, 23 causes heating of the tube assembly and its contents (water in this case). This is known as Joule heating. Heating converts the fluid (water) to vapor, generating hydrostatic pressure in housing 18. The wattage density is made high enough by a selection of supply voltage, heater tube resistance and tube surface area of the heater tube 15 to heat and vaporize the water therein generating 3000 PSI steam pressure in approximately 0.9 seconds. This fluid (water) is quickly heated by enclosing it in a small cross section electrically resistive metal tube and flowing a high current through the tube to generate high wattage. Fast temperature rise is due to the fact that the watts per thermal mass (metal and fluid) is high; the flow path of heat through the mass is short; and the watts loss rate to ambient is slower than watts generation, due to low surface area of a small tube.

The quick heating of the water quickly generates steam near a critical temperature of 700 degrees F and critical pressure slightly over 3000 PSI. This high pressure steam will then generate a hydrostatic pressure which acts on one end of the piston 16 forcing it to move from a retracted terminal position, within housing 18, to an extended terminal position in which it projects out of the housing 18.

Steam at 3100 PSI requires metal and water temperature of approximately 700 degrees F. The loss of heat to ambient air is in proportion to the difference between the metal and water temperature and the ambient temperature. In addition, at temperatures above 500 degrees F, there is also considerable loss of radiant heat energy. Thus, when the electric circuit is open (power interrupted), the retraction stroke of piston 16 is correspondingly fast. The return load, in this case produced by a spring 12, may be a spring selected of a spring rate as low as practical so that during the stroke, the pressure change required and consequently the temperature change of the steam is also low, increasing the piston retraction speed during the cooling cycle.

By operating near the critical point of water, the pressure increase per degree F change in temperature becomes quite large as compared with that at lower temperatures. For example, the pressure change per degree F. at 300 degrees F. is 0.992 PSI, while the pressure change per degree at 700 degrees F. is 20.4 PSI (more than twenty times that at 300 degrees F). This requires a smaller temperature change during cooling at high temperatures than at lower temperatures. The pressure decrease for piston retractor thus occurs faster at less temperature change. A further increase in cooling rate is provided by the return of the water that was displaced from the heater tube 15 into the cooling tube 23. When this water reenters the heating tube 15, the steam in the tube is cooled by direct contact with the turbulent flow of relatively cooler water and the cooling rate is further increased.

Accompanying this fast temperature change is a fast pressure decrease which, acting with a low spring rate, causes a fast retraction of the piston. The retraction speed of the piston is far in excess of what it would be were it not for the combination of all of these factors. Thus the speed and force of the piston during the power stroke and the speed during the retraction stroke is far in excess of what it would be were it not for the combinations of the present invention.

STATEMENT OF OPERATION

Referring now to all of the drawings, operation of the present invention will be described. For purpose of description it will first be assumed that the actuator 1 is in the fully retracted, nonenergized position illustrated in FIGS. 1 and 2. It will also be assumed that the operable device 3 is a ball valve which is in a closed position. The roller follower 7a of switch 7 is at a switching point of the cam 6 and the NO terminal thereof is opened. The remote switch 11 is assummed to be in the opened position of the NC terminal. The circuit breaker 14 is closed and limit switch 10 is closed by the crank arm 8 with the actuator piston fully retracted. In this condition, no current is flowing through the heater tube 15 of the actuator 1.

To open the ball valve 3, the switch 11 is manually switched to the closed position of the NC terminal. Since switch 7 is in the closed position of the NC terminal, current will flow through the common lead 13, limit switch 10, the heater tube 15, wire 13b and the NC terminals of switches 7 and 11 all in series with the power supply P. As previously described, the wattage density is such as to generate 3000 PSI steam pressure in about 0.9 seconds. This steam pressure acting against one end of the piston 16 forces the piston 16 out of the housing 18, moving the crank arm 8 in the direction of the arrow as shown in FIG. 2. Movement of the crank arm 8 rotates the stem extension 4, through the one-way clutch bearing 9, turning the stem extension 4 and the stem 5 through an angle of ninety degrees, opening the ball valve 3. During this movement, the crank arm 8 stretches return spring 12, building up a sufficient force in the spring to eventually return the crank arm.

When the crank arm 8 has rotated ninety degrees, the extension 8b thereof contacts the limit switch 10 and moves it to the open position. At substantially the same time, the cam 6 opens the NC terminal of switch 7. Current flow is thus interrupted to the heater tube 15 which is at a temperature of over 600 degrees F. Once current is interrupted, the heater tube 15 rapidly cools toward ambient temperature and the actuator piston 16 returns into the actuator housing 18, being forced thereinto by the pull of spring 12. Once the piston 16 and arm 8 have been fully retracted, the extension 8a of the crank closes the limit& switch 10 and the system is ready for the next power stroke.

At this point, no current is flowing until the remote switch 11 is again actuated and the cycle repeated. This time, the power stroke will close the ball valve 3 which had been opened by the previous power stroke and the current will again be switched off letting the shaft retract with the closed valve ready to be opened by the next power stroke.

The limit switch 10 functions to insure power cutoff at full piston stroke in the event the remote switch 11 is thrown during a cooling mode while piston 16 is retracting but before being fully retracted. If the limit switch 10 were not in the circuit, the shaft rotation would not be sufficient to cam the switch 7 to the power off condition of switch 7 and the heater tube would overheat and might self destruct. The reset circuit breaker 14 is provided to guard against this condition. The circuit breaker or switch 14 is in series with the common switch lead 13 and in series with the three switches 7, 10 and 11. It is sized to open in about 1.5 seconds. This is fast enough to prevent heater tube damage but not fast enough to open during normal operation of the actuator.

The electrothermally operated actuator of the present invention has a number of features which in combination result in many improved characteristics. Most importantly, it operates at a speed of at least twenty times that of self-contained thermal actuators of the prior art. The combined features cf the present invention allow use of a smaller diameter heater tube and thinner tube wall at a given pressure. This results in a smaller cross section tube wall, smaller cross section of fluid and less thermal mass. These features permit higher operating pressure (small diameter lowers hoop stress in the formula $S = PD/2T$). The higher operating pressure permits a smaller diameter piston in the actuator and allows smaller volume fluid change during the piston stroke. The smaller volume change during the piston stroke allows smaller fluid fill volume. The smaller fluid fill volume allows a small long tube which, when of resistive metal, has sufficient resistance to permit use of 120 V electrical supply without the current exceeding 10 AMPS. This allows use of lower cost, standard switches and other electrical components and also eliminates the need for a voltage transformer, thereby reducing cost, weight and bulk of the system.

The smaller thermal mass of the tube and fluid allows a higher wattage per thermal mass within desired current limits, causing faster heating, pressure and piston power stroke. The small diameter tube has a short heat flow path from inside to surface resulting in faster heating and cooling thereby producing faster piston power stroke and piston retraction stroke. The fast power stroke (0.9 seconds) utilized on both open and closing of a valve, results in opening and closing of a valve in less than one second. The use of a one-way or overriding clutch to rotate a valve stem in one direction for both opening and closing permits use of the power stroke for both valve operations. The use of a combination of a four lobed cam operating a control switch and a limit switch limiting the power stroke by opening the circuit insures that the valve would be turned at an angle of ninety degrees on each operation even if the remotely operated switch were reversed before the cooling stroke had been completed.

A unique sealing system for the piston cylinder actuator is utilized. With this sealing system, the housing bore and the piston surface are sealed against high pressure without metal contact. This prevents scratching of these surfaces which would cause leaking of the sealed fluid. The nonmetallic soft bearings used with the present invention actually polish the piston. Instead of sealing the water fill (a moderate vapor pressure fluid) directly with a spring loaded seal, a buffer fluid having a low vapor pressure is sealed and another seal separates the two fluids at their interface. Because of this the molecular layer of the buffer fluid, absorbed on the piston, will lose less due to evaporation when the piston is exposed to the atmosphere.

As previously described and best seen in FIG. 3, seal assemblies of the dual sealing system of the exemplary embodiment of the invention are separated by a tubular spacer 32 and the annular space between the seal assemblies is filled with a sealing fluid with characteristics of lubrication and low vapor pressure, e.g. methyl alkyl silicone. In another embodiment, shown and described in the parent U.S. application Ser. No. 412,187, filed Sept. 25, 1989, a helically wound spring is used instead of the tubular spacer 32. It has been found that the tubular spacer 32 is a more desirable construction.

Since the two seal assemblies of the exemplary embodiment are separated by a rigid tubular spacer instead of a helically wound spring, the generated pressure of the thermally heated working fluid is no longer transmitted, undiminished, through the first seal assembly to the sealing fluid, but is approximately divided so that the pressure drop across the first seal assembly is approximately equal to the pressure drop across the second seal assembly (to atmosphere). Any pressure drop inequality is due to the effectiveness of sealing of each seal assembly. For example, in an actuator in which the two seal assemblies are closely equal in effectiveness, and the pressure generated is, typically, about 3.100 PSI, and the biasing spring 26 applies a force which when divided by the annular area of the seals, generates a pressure of 100 PSI, the total sealing pressure generated is about 3200 PSI.

The amount of leak past each seal assembly is proportional to the pressure drop across that seal assembly. At the beginning of operation, the pressure of the sealing fluid can, for convenience, be assumed to be atmospheric. When 3,100 PSI is generated in the working fluid, the pressure drop across the first seal assembly becomes 3100 plus 100 PSI spring bias pressure or 3200 PSI. The pressure drop across the second seal assembly to atmosphere is then zero.

Obviously, the leak rate across the first seal assembly with 3200 PSI pressure drop is greater than the leak across the second seal assembly with zero pressure drop. The pressure between the two seal assemblies builds up until the pressure drop across each seal assembly becomes approximately equal. At this point there will be slight differences in pressure drop across each seal assembly depending on the sealability of that particular seal assembly. In the example, there will be approximately 1600 PSI drop across the first seal assembly and 1600 PSI drop across the second seal assembly when the sealing pressures stabilize.

Thus, very importantly, the pressure drops across the seals have been approximately halved and the leak rate has been greatly reduced. Of even more importance, is the fact that the pressure force, due to the pressure drop across the first seal assembly, is transmitted, undiminished, by the tubular 32 spacer to the second seal assembly where it adds to the pressure force of the sealing fluid pressure on the second seal assembly. For example, assume 3200 PSI generated pressure. The pressure has stabilized and is 1600 PSI between seal assemblies. If the annular area of the seal is 0.05 sq. in., the pressure force on the tubular spacer$=0.05 \times 1600 = 80$ lb. Assume that the end of the spacer in contact with the second seal assembly is sealed, pressure-tight, against seal ring 33. The exposed area of seal ring $33 = 0.05 - .0125 = .0375$ sq. in. and the pressure force on seal ring $33 = 1600 \times 0.0375 = 60$ lb. The total force on the second seal assembly$=80 + 60 = 140$ lb. The equivalent pressure on the second seal assembly$= F/A = 140/0.05 = 2800$ PSI. Therefore, the sealing pressure of the first seal assembly is 1600 PSI, while the sealing pressure of the second seal assembly is 2800 PSI.

By comparison, with a spring in the space containing sealing fluid, the pressure drop across the first seal assembly would be about 100 PSI (due to the biasing spring) and the pressure within the space would be equal to the generated pressure of 3200 PSI. (Due to hydraulic transmission of pressure, neglecting a small friction factor of the seals). The pressure on the second seal would be about 3200 PSI.

The key concept is that in the arrangement of the exemplary embodiment, the sealing pressure of the elastomeric seal in the second seal assembly is $2800 - 1600 = 1200$ PSI in excess of the contained pressure, while the sealing pressure on the 100 PSI spring biased seal in this instance, would be 100 PSI in excess of the contained pressure. Therefore, the seal system of the exemplary embodiment produces a seal that has a 1200% increase in excess sealing pressure in this application.

While a heavier biasing spring may be used to obtain larger sealing forces, it is to be noted that the sealing pressure generated by such a spring would be constant, while the sealing pressure generated by the present invention would be proportional to the pressure being sealed. Obviously, such an excess sealing pressure at low system pressures would exert high frictional forces on the piston and the pressure force of the lower working pressures would be lower than the frictional drag on the piston, thereby freezing the piston's position.

With the seal system of the exemplary embodiment, the stroke cycle life has been raised from a maximum attained of 150,000 cycles, when using a dual-spring bias, to a cycle life of slightly over 705,000 cycles. Apparently, as the cycle life extended, the polishing action of the non-metallic bearings and seals on the piston decreased the leak rate experienced in the above life tests by increasing the quality of the piston surface finish.

As can be seen, the present invention utilizes a combination of many unique features to produce an electrothermally operated actuator much superior to those of the prior art. Although a single embodiment of the invention has been described herein, many variations can be made by those skilled in the art without departing from the scope of the invention. For example, in the exemplary embodiment of the invention, water is heated to approximately 700 degrees F. to generate steam at slightly more than 3100 PSI. Actually heating water to a critical point of 600 degrees F. and 1500 PSI would be sufficient in many cases. In any event, it is intended that the scope of the invention be limited only by the claims which follow.

I claim:

1. An improved actuator of the type in which a piston is translatable in a piston housing in a response to the pressure of a working fluid in fluid communication with said housing and one end of said piston, the opposite end of said piston projecting from said piston housing through an opening therein for transmitting mechanical power to an operable device, sealing means being carried by said housing to prevent leakage of said working fluid therefrom; one of said improvements residing in said sealing means which comprises:
   a first seal sealingly surrounding said piston and sealingly engaging said piston housing, one side of said first seal being exposed to said working fluid within said housing;
   a second seal axially spaced from said first seal sealingly surrounding said piston and sealingly engaging said piston housing, one side of said second seal being exposed to the environment into which said piston projects from said housing; and
   a sealing fluid disposed in an annular space surrounding said piston between said first and second seals, said sealing fluid having lubrication characteristics and a substantially lower vapor pressure than that of said working fluid.

2. An actuator as set forth in claim 1 in which said sealing means includes biasing means surrounding said piston for placing axially compressive forces on said first and second seals.

3. An actuator as set forth in claim 2 including a tubular spacer surrounding said piston in said annular space between said first and second seals and by which said compressive forces of said biasing means and the pressure forces of said working fluid are transmitted between said first and second seals.

4. An actuator as set forth in claim 3 in which said biasing means comprises at least one helically wound spring surrounding said piston on an opposite side of said first seal from said tubular spacer.

5. An actuator as set forth in claim 1 in which said first and second seals are stacked seals each of which comprises an elastomeric seal ring sandwiched between annular washers of non-metallic materials.

6. An actuator as set forth in claim 5 in which a pair of said nonmetallic annular washers on each side of said elastomeric seal have zero clearance between the outside diameters thereof and the inside walls of said piston housing and zero clearance between the inside diameters thereof and the outside diameter of said piston.

7. An actuator as set forth in claim 6 including at least one nonmetallic annular washer on the opposite side of each of said zero clearance washers from said elastomeric washers and in contact with said zero clearance washers with a close but nonbinding clearance on its inside diameter with said piston and close but nonbinding clearance on its outside diameter with the inside walls of said piston housing thereby preventing the extrusion of said zero clearance washers past them due to generated pressure.

8. An actuator as set forth in claim 1 including bearing means carried by said piston housing supporting said piston for reciprocal movement within said piston housing.

9. An actuator as set forth in claim 8 in which said piston housing includes a cylindrical bore and in which said bearing means comprises a tubular sleeve bearing carried in said bore and surrounding a portion of said piston, said first and second seals and said sealing fluid being disposed in an annular space adjacent said sleeve bearing.

10. An actuator as set forth in claim 9 in which said first and second seals and said sleeve bearing are of non-metallic materials.

11. An actuator as set forth in claim 9 in which said sealing means includes biasing means disposed in said cylindrical bore adjacent one of said first and second seals by which axially compressive forces are applied to said first and second seals.

12. An actuator as set forth in claim 11 in which said biasing means comprises at least one helically wound spring surrounding a portion of said piston and disposed in said cylindrical bore on the opposite side of said first and second seals from said sleeve bearing.

13. An actuator as set forth in claim 10 in which said first and second seals are stacked seals each of which comprises an elastomeric seal ring sandwiched between relatively rigid annular washers, there being substantially no clearance between the outside diameter of said rigid annular washers and said cylindrical bore and the inside diameter of said rigid annular washers and said piston.

14. An actuator as set forth in claim 1 in which said actuator is an electrothermally operated actuator in which said working fluid is expandable in response to electrical heating thereof to provide the pressure necessary to translate said piston.

15. The actuator of claim 14 in which said working fluid is water a portion of which, upon heating, becomes vapor.

16. The actuator of claim 15 in which said sealing fluid is a low-vapor-pressure silicone.

17. An actuator as set forth in claim 1 in which said actuator is an electrothermally operated actuator of the type in which said piston is translatable in said piston housing in response to electrical heating of said working fluid, said working fluid being an expandable working fluid which is at least partially disposed in tube means through which an electric current may be passed for heating of said tube means and said working fluid therein, said tube means being in an electric circuit which includes a power source and means for selectively activating or deactivating said power source in said electric circuit.

18. An actuator as set forth in claim 17 in which said working fluid is expandable in response to said electrical heating thereof upon activation of said power source to provide the pressure necessary for moving said piston from a first terminal position toward a second terminal position, said actuator including biasing means for returning said piston to said first terminal position upon deactivation of said power source and the resultant cooling and contraction of said working fluid.

19. An actuator as set forth in claim 18 in which said tube means comprises a first metallic tube of relatively small cross-section one end of which is connected to one end of a second metallic tube of relatively large cross-section, the opposite end of said first tube being closed and connected to one terminal of said power source, the opposite end of said second tube being opened and connected in fluid communication with said housing and said one end of said piston, said housing being connected to another terminal of said power source.

20. An actuator as set forth in claim 19 in which said first and second tubes are wound in a helical coil from said opposite end of said first tube to said opposite end of said second tube.

21. An actuator as set forth in claim 19 in which said working fluid is a vaporizable fluid.

22. An actuator as set forth in claim 21 in which the voltage of said power source, the electrical resistance of said first tube and the surface area of said first tube is selected so that upon activation of said power source said vaporizable fluid therein is vaporized, generating sufficient pressure, in approximately one second or less, to move said piston from said first to said second terminal position.

23. An actuator as set forth in claim 22 in which said working fluid is water, the water in said first tube being converted to steam, in said approximately one second or less, at a pressure of at least 1500 psi.

24. An actuator as set forth in claim 23 in which said first tube and said water therein is heated to a temperature in excess of 600 degrees F. in said approximately one second or less.

25. An actuator as set forth in claim 22 in which said power source is 120 volts, the current through said electrical circuit not exceeding 10 amps.

26. An actuator as set forth in: claim 22 in which said second tube of relatively large cross-section has substantially greater surface area and substantially less electrical resistance than said first tube so that upon deactivation of said power source, said vaporizable fluid is quickly cooled by radiation and convection and by flow from the cooler second tube allowing said biasing means to rapidly return said piston to said first terminal position.

27. An actuator as set forth in claim 19 in which said first metallic tube is small in diameter and of thin walls containing a small volume of working fluid which heats rapidly upon activation of said power source and which cools rapidly on deactivation of said power source, permitting rapid cycling of said piston between said first and second terminal positions.

28. An actuator as set forth in claim 27 in which the electrical resistance of said first metallic tube is sufficient to permit the use of a 120 volt power source.

29. An actuator as set forth in claim 27 in which the size of said first metallic tube, the volume of working fluid therein and the characteristics of said power source are such as to cause movement of said piston between said terminal positions in less than one second.

* * * * *